Dec. 13, 1938.  G. ESTELLES  2,139,941
MEANS FOR ADJUSTING DRIVING CHAINS
Filed Aug. 12, 1938
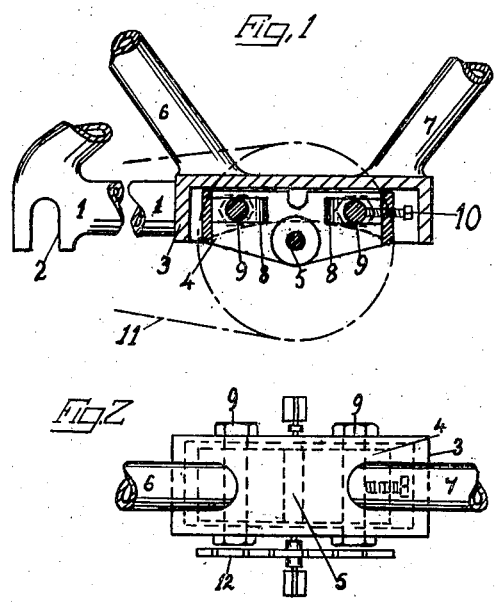
INVENTOR
Guillermo ESTELLES,
By Chatwin Company
Attys.

Patented Dec. 13, 1938

2,139,941

UNITED STATES PATENT OFFICE 2,139,941

MEANS FOR ADJUSTING DRIVING CHAINS

Guillermo Estelles, London, England

Application August 12, 1938, Serial No. 224,541
In Great Britain March 1, 1937

2 Claims. (Cl. 74—242.14)

This invention relates to means for adjusting the chains of bicycles, motorcycles and the like.

It is usual to adjust the driving chain of a bicycle by moving the spindle of the rear wheel in a slot provided in the rear forks, a screw-threaded eye being adapted to engage with the spindle and the open end of the slot so that the spindle can be adjusted after first slacking off its fixing nuts. This is not very satisfactory and the wheel is often out of alinement as a result of such adjustment.

These objections are overcome according to the improved construction by providing the adjustment at the bottom bracket this having the advantage that once the rear wheel is in place and correctly adjusted it has not to be touched again for the adjustment of the chain.

If therefore the rear wheel, for any reason has to be removed it in no way affects the adjustment of the chain.

The rear fork is preferably formed with slots to receive the rear spindle such slots being disposed in a vertical plane and being open at the underside so that the frame sits upon the spindle.

The improved construction is shown in the accompanying drawing in which:

Figure 1 is a vertical elevation with one side wall of the casing for the adjusting mechanism, removed; Fig. 2 is a corresponding plan view of the bracket alone.

According to this construction the rear forks 1 are slotted vertically at 2 to receive the wheel axle and at the forward end connect with a housing 3 in which can slide the bracket or bearing 4 for the crank spindle 5. The seat tube 6 and the front pillar 7 are also connected to the housing 3 which therefore takes the place of the ordinary bottom bracket.

The housing 3 forms a slideway or guide for the bracket or the like 4 which acts as a bottom bracket and serves as bearing for the crank spindle 5. This bracket 4 is formed with a slot or preferably as in the drawing, two slots 8 through which and the housing 3 can pass bolts or the like 9 for rigidly holding the housing 3 and the bracket 4 together.

A screw 10 with one end bearing against a fixed surface such as the bolt 9 or the housing 3, is provided so that upon rotation thereof and loosening of the bolts 9, the bracket 4 can be moved in relation to the housing 3 to adjust the chain 11 which passes over the chain wheel 12 mounted on spindle 5 supported in said bracket 4 as will be easily understood. The screw 10 may pass through the housing 3 if desired.

The rear fork and rear stays can in this way also be made in one piece.

The metal of which bicycle frames are usually formed is not of great thickness or rigidity, and by having the bracket 4 fitted snugly between the side walls of the housing 3, sufficient binding action may be had upon tightening of the nuts upon the bolts 9 to hold the bracket against rattling or rearward movement. It will be readily understood that the pull of the chain tends to move the bracket rearwardly with respect to the housing. However, all of this rearward pull will be effectively resisted by the screw 10, which is threaded into the bracket, and the end of which bears against one of the fixed bolts 9.

While this arrangement of screw 10 provides a simple and economical way of accomplishing the desired result, it will be clear that an adjusting screw might be placed in many other relations, it being only necessary that it be mounted to exert a thrust between the bracket and housing. When it does this, it takes the rearward strain exerted by the action of the sprocket chain, leaving the binding bolts 9 to perform only the very slight additional task of compressing the housing and bracket enough to prevent rattling.

I claim:

1. Means for adjusting the driving sprocket and driving chain of a bicycle, comprising in combination a frame consisting of the rear forks and front pillar, said rear forks having means at the rear end thereof for mounting the rear wheel of a bicycle therein, a hollow housing located at the forward ends of the rear forks and to which the forward ends of the rear forks are connected and to which the front pillar is likewise connected, a bracket slidably mounted in said housing, a pedal crank spindle having rotative mounting in said bracket, a driving sprocket upon the pedal crank spindle, and means for binding the bracket in varying positions of endwise adjustment with respect to the said housing.

2. The combination with a bicycle frame comprising a seat tube, rear forks and front pillar, and a hollow housing rigid with and uniting said seat tube, rear forks and pillar, said housing being open at its underside; of a bracket seated in the hollow housing and having slotted side walls, bolts passing through the slots of the bracket and through the side walls of the housing, said bolts being provided with nuts, the tightening of which effects a binding together of the housing and bracket, a crank spindle journaled for rotation in the bracket, a driving sprocket and pedals upon said spindle, and an adjusting screw engaged with the bracket and a fixed part of the remaining structure and serving to exert a thrust in a direction to move the bracket, sprocket and pedals bodily forward with respect to the housing.

GUILLERMO ESTELLES.